US007433511B2

(12) United States Patent
Jacob (10) Patent No.: US 7,433,511 B2
(45) Date of Patent: Oct. 7, 2008

(54) COLOR ADJUSTMENT USING BLACK GENERATION AND UNDER COLOR REMOVAL

(75) Inventor: Steve A. Jacob, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1059 days.

(21) Appl. No.: 10/688,601

(22) Filed: Oct. 17, 2003

(65) Prior Publication Data

US 2005/0083542 A1 Apr. 21, 2005

(51) Int. Cl.
*G06K 9/00* (2006.01)
*G03F 3/08* (2006.01)

(52) U.S. Cl. ........................ 382/167; 358/520

(58) Field of Classification Search ............... 382/162, 382/167, 165, 276, 164; 345/603, 604; 358/1.9, 358/2.1, 500, 520, 515, 518, 525
See application file for complete search history.

(56) References Cited

U.S. PATENT DOCUMENTS

| 5,101,283 | A |   | 3/1992  | Seki et al. |
|-----------|---|---|---------|-------------|
| 5,132,786 | A |   | 7/1992  | Ishiwata |
| 5,343,312 | A |   | 8/1994  | Hibi et al. |
| 5,392,365 | A | * | 2/1995  | Steinkirchner ............... 382/260 |
| 5,673,335 | A | * | 9/1997  | Ohta et al. ................... 382/167 |
| 5,734,802 | A | * | 3/1998  | Maltz et al. ................... 358/1.9 |
| 5,978,506 | A |   | 11/1999 | Murayama et al. |
| 6,580,822 | B1|   | 6/2003  | Takei |
| 6,628,833 | B1| * | 9/2003  | Horie .......................... 382/173 |
| 7,023,582 | B2| * | 4/2006  | Sawada et al. ............... 358/1.9 |
| 7,072,072 | B1| * | 7/2006  | Balasubramanian et al. . 358/1.9 |

* cited by examiner

*Primary Examiner*—Samir A Ahmed
*Assistant Examiner*—Clifton G Daley (57) ABSTRACT

In one embodiment, mapping color data from CMY to CMYK is performed in a manner which allows selection between creating better harmony between process-neutral and K-only neutral images when printed side-by-side, or creating better-looking images individually. In the course of the mapping, adjustment is made over a degree to which BG (black generation) color coefficient generation is similar for process-neutral and K-only neutral images to produce BG coefficients. Similarly, adjustment is made over a degree to which UCR (under color removal) color coefficient generation is similar for process-neutral and K-only neutral images to produce UCR coefficients. Color data is them mapped, using the produced BG coefficients and the produced UCR coefficients.

21 Claims, 9 Drawing Sheets

COLOR ADJUSTMENT USING BLACK GENERATION AND UNDER COLOR REMOVAL

BACKGROUND

It is frequently the case that data in a CMY (cyan, magenta, yellow) format is received by, or generated within, a printer or other output device. In theory, black and gray colors may be created from CMY data along a process-neutral axis (i.e. an axis along which similar quantities of cyan, magenta and yellow ink are used). However, the actual output of such data is typically brown rather than black or gray.

As a result, it is frequently the case that CMY data is translated into CMYK (cyan, magenta, yellow, black) data, and printed in part with black ink. In general, use of CMYK data results in more realistic and better-looking output, since black ink is more effective in certain situations than the more transparent cyan, magenta and yellow inks.

While the addition of black ink to CMY makes possible much-improved output for some graphics, other print output, such as photographs, may look better with a process-neutral axis. With K-only neutral axis and process-neutral axis images, particularly in a single document, finding effective ways by which to map CMY to CMYK to result in harmony between the images is a challenging problem.

SUMMARY

In one embodiment, black generation (BG) coefficients and under color removal (UCR) coefficients are used when mapping CMY color data to CMYK color data to adjust colors within a process-neutral image and a K-only image to harmonize the appearance of the images. Black generation involves increasing the black value (i.e. the K value) as a percentage of the gray component (i.e. as a percentage of the values of C, M and Y which result in gray). UCR involves removing similar amounts of C, M and Y (which together form black) and replacing the removed ink with black (K) ink. Process-neutral images (e.g. photographs) use equal amounts of C, M and Y to produce grays and blacks. K-only neutral images (e.g. business graphics and logos) use black (K) to produce grays and black. In generating the BG coefficients, a degree to which BG coefficients are similar for process-neutral and K-only neutral images is adjusted. Additionally, in generating the UCR coefficients, a degree to which UCR coefficients are similar for process-neutral and K-only neutral images is adjusted. The generated BG coefficients and the generated UCR coefficients are then used in mapping CMY to CMYK color data. Advantageously, the adjustment allows a choice between: emphasizing the harmony of the colors of process-neutral and K-only neutral images printed side-by-side; or alternatively, enhancing the appearance of each image independently, such as by providing a more gradual transition between colors and grays in process-neutral images, despite causing color differences with K-only neutral images.

BRIEF DESCRIPTION OF THE DRAWINGS

The same reference numbers are used throughout the drawings to reference like features and components.

DETAILED DESCRIPTION

Overview

As will be seen in greater detail below, color mapping from CMY to CMYK tends to result in a better-looking image, due to the advantages of black ink (K) over black formed from equal parts of cyan, magenta and yellow (CMY) ink. Additionally, it will be seen that some images, such as business graphics, tend to look better with a K-only neutral axis, i.e. when printed using data from a color space wherein the neutral axis is printed using black ink. However, other images, such as photographs—while still tending to benefit from the use of black ink—tend to look better when printed with a process-neutral axis, i.e. when printed using data from a color space wherein the neutral axis is printed using mixed CMY ink.

As will also be seen in greater detail below, when an image printed with a K-only neutral axis (such as business graphics logos) is printed next to an image printed with a process-neutral axis (such as a photograph), it is desirable to be able to control the degree to which colors in both images which should be the same, are the same. (When the two images are not printed next to each other, it is more important to make each image look its best, and less important to match hues of similar colors.) Since the two images differ in how their colors closer to the neutral axis were produced (the K-only neutral axis is printed with black ink; the process-neutral axis is printed with mixed CMY ink) it is the colors near neutral (i.e. the grayer colors) which will be different. In contrast, the colors further from the neutral (further from gray) will tend to be the same.

Accordingly, as will be seen in greater detail below, it is important to be able to control a distance, wherein colors more than the distance from neutral are mapped the same for both image types, and wherein colors less than the distance from neutral are mapped differently (according to the type of the color space within which they are contained: K-only or process-neutral). By making this distance smaller when two images are to be printed near each other, we can better match colors between the images, creating a better overall appearance. By making this distance greater when two images are not printed next to each other, we can enjoy a more gradual transition from color to gray in process-neutral based images, creating a better appearance in such images.

In the implementations discussed in greater detail below, control over the distance referred to above—wherein colors more than the distance from neutral are mapped the same for both image types, and wherein colors less than the distance from neutral are mapped differently—is obtained by controlling black generation (BG) color coefficients and under color removal (UCR) color coefficients. In particular, where K-only and process-neutral images will be printed near each other, their respective BG coefficients and their respective UCR coefficients will be similar over a greater range of colors, thereby harmonizing the appearance of the images. Additionally, where K-only and process-neutral images will be printed more distantly from each other, their respective BG coefficients and their respective UCR coefficients will be similar over a smaller range of colors, thereby providing a greater range of colors within which process-neutral images may more gracefully transition to gray without sharp transition.

Accordingly, by controlling the range of colors over which BG and UCR coefficients associated with K-only and process-neutral images are similar and dissimilar for use during CMY to CMYK mapping, K-only and process-neutral images may be made to look more harmonious when printed side-by-side, or individually more attractive when printed separately.

Discussion of the Figures

Figure 1:
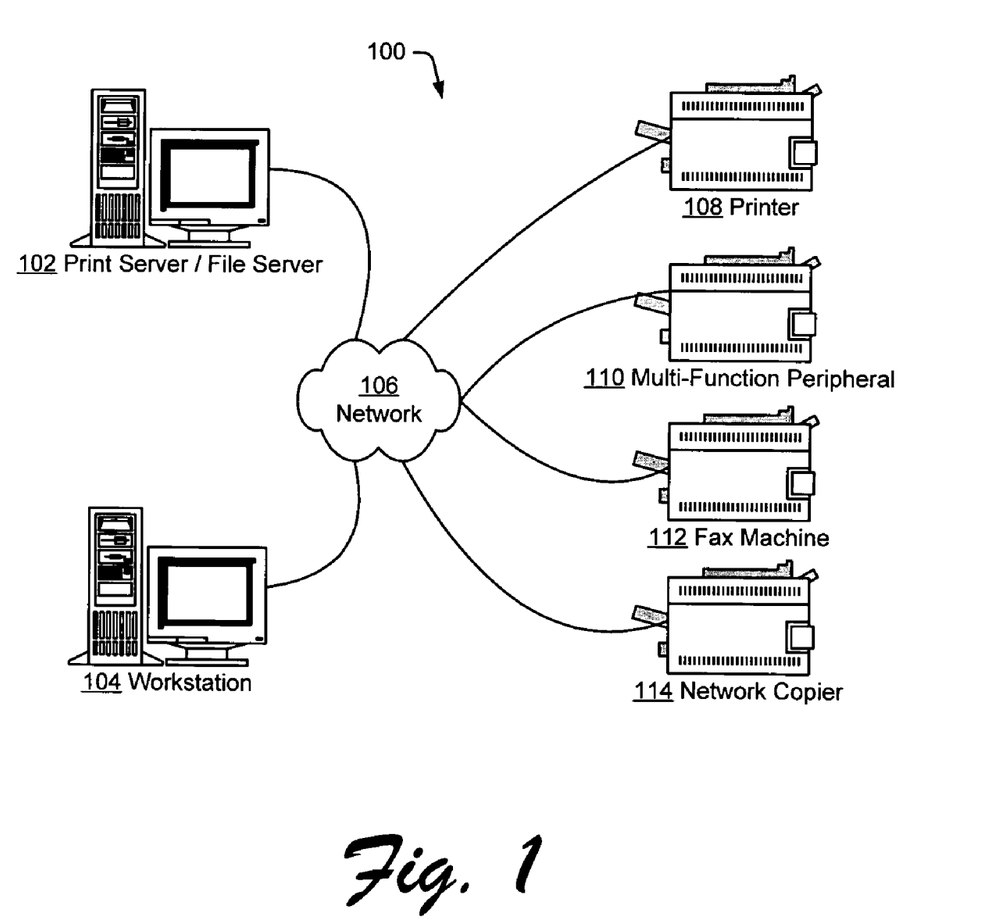
FIG. 1 is an illustration of one possible environment within which color data may be separated and balanced.

FIG. 1 shows a network environment 100 within which a color separation and balancing algorithm may be employed. A print server or file server 102 is configured to receive a print job from any of a plurality of workstations 104. The print job may be sent over a network 106 to a printer 108, multifunctional peripheral 110, fax machine 112, network copier 114 or other output device.

Figure 2:
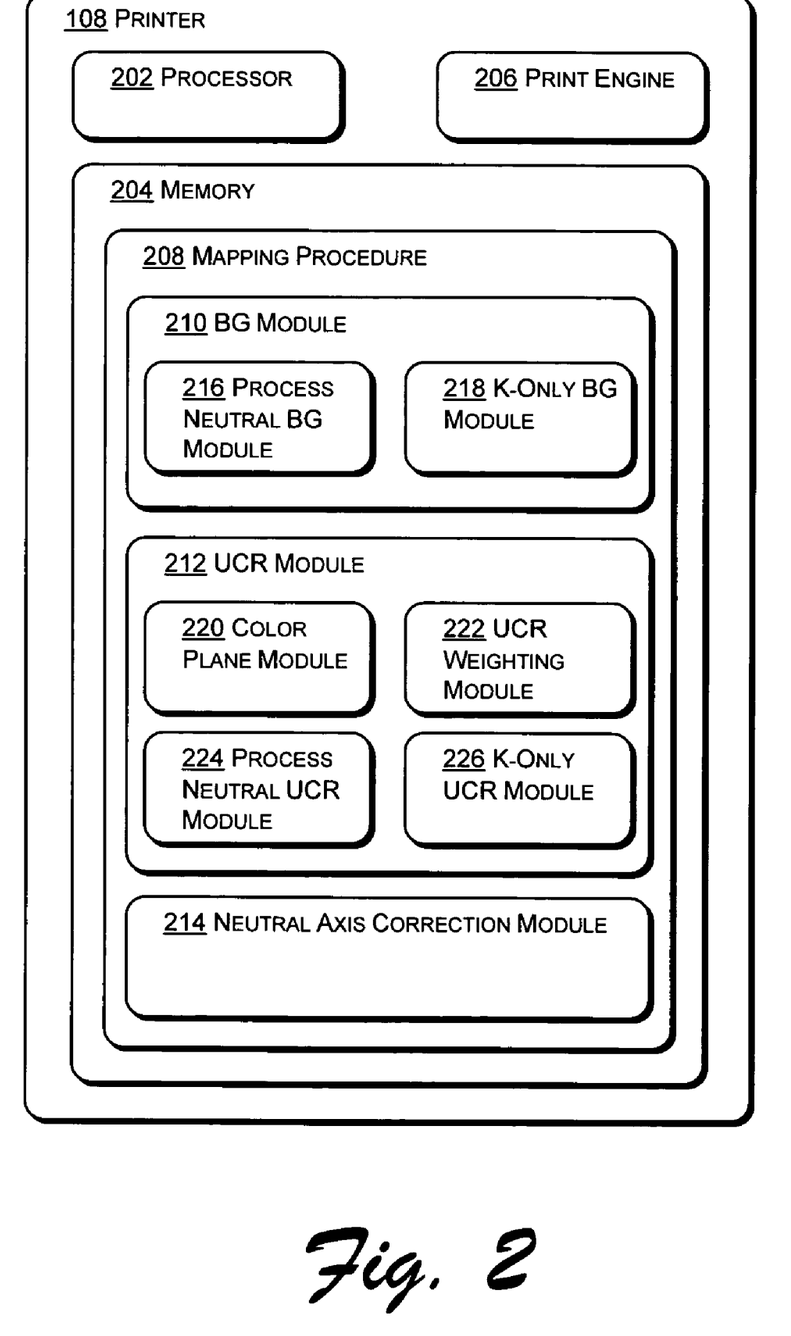
FIG. 2 is a block diagram that illustrates an exemplary implementation of a printer wherein color data is separated and balanced according to one embodiment of the invention.

FIG. 2 is a block diagram showing one possible implementation of color adjustment using BG and UCR, illustrated—for purposes of example only—in a printer 108. Similarly, color adjustment using BG and UCR could be performed on a host computer, thereby generating two CMY to CMYK color look up tables (CLUTs). The CLUTs could then be located in memory of the printer 108. Still further alternative arrangements are possible, as can easily be seen. A processor 202 having access to memory 204 drives a print engine 206. The memory 204 contains a mapping procedure 208 configured to map CMY color data to CMYK color data. An exemplary version of the mapping procedure 208 utilizes BG and UCR to map CMY color data into CMYK color data. A black generation (BG) module 210 and an under color removal (UCR) module 212 facilitate the mapping of CMY color data to CMYK color data. A neutral axis correction module 214 facilitates mapping a color space to correct a neutral axis within the color space, resulting in more neutral appearance in neutral colors.

The exemplary BG module 210 may be configured to include a process-neutral BG module 216 which is configured to obtain a BG coefficient for use in mapping an element of CMY color data into an element of CMYK color data wherein a process-neutral axis is used. A process-neutral axis represents neutral colors (e.g. gray or black) by combining CMY and K colors, and is frequently advantageous when mapping color data associated with a photograph.

Additionally, the BG module 210 includes a K-only BG module 218 which is configured to obtain a BG coefficient for use in mapping an element of CMY color data into an element of CMYK color data wherein a K-only neutral axis is used. A K-only neutral axis represents neutral colors by using black toner or ink, and is frequently advantageous when mapping color data associated with text and certain graphics or line art images wherein control over the neutral axis is of even greater importance. Use of the K-only neutral axis reduces or prevents problems such as color plane registration (CPR) errors. Such errors often result in a blurred purple color rather than the desired black or gray.

As will be seen in much greater detail later, during mapping of CMY to CMYK, the process-neutral BG module 216 and the K-only BG module 218 tend to return very similar BG coefficients associated with greater color are input, and less similar BG coefficients where the same grayer color value is input. Additionally, in each module 216, 218 a line (520 see FIG. 5) conceptually dividing the brighter colors from the grayer colors can be moved. This line may be moved in each module 216, 218 to result in both modules returning the same BG coefficient over a wider range of colors where a K-only neutral image and a process-neutral image are to be printed beside each other, thereby harmonizing the images. Similarly, this line may be moved in each module 216, 218 to result in both modules returning different BG coefficients over a wider range of grayer colors where the two images are not printed beside each other, thereby allowing process-neutral images to look better due to smoother transition from brighter colors to grayer colors.

The exemplary UCR module 212 may be configured to include a color plane module 220 to produce UCR coefficients for use in removing substantially equal quantities of CM and Y from a color. While the removed "gray component" formed by the similar quantities of CM and Y could in some applications be replaced by black, the UCR module decouples the black generation process from the under color removal process. Additionally, the UCR module 212 may include a UCR weighting module 222 to weight UCR values. As seen below, a weight factor can be added to UCR values as a function of distance from the neutral axis, and may include both primary and secondary colors.

As will be seen in much greater detail later, during mapping of CMY to CMYK, a process-neutral UCR module 224 and a K-only UCR module 226 tend to return very similar UCR coefficients where the same brighter color value is input and less similar UCR coefficients where the same grayer color value is input. Additionally, in each module 224, 226 a line (718 see FIG. 7) conceptually dividing the brighter colors from the grayer colors can be moved. This line may be moved in each module 224, 226 to result in both modules returning the same UCR coefficient over a wider range of colors where a K-only neutral image and a process-neutral image are to be printed beside each other, thereby harmonizing the images. Similarly, this line may be moved in each module 224, 226 to result in both modules returning different UCR coefficients over a wider range of grayer colors where the two images are not printed beside each other, thereby allowing process-neutral images to look better due to smoother transition from brighter colors to grayer colors.

Figure 3:
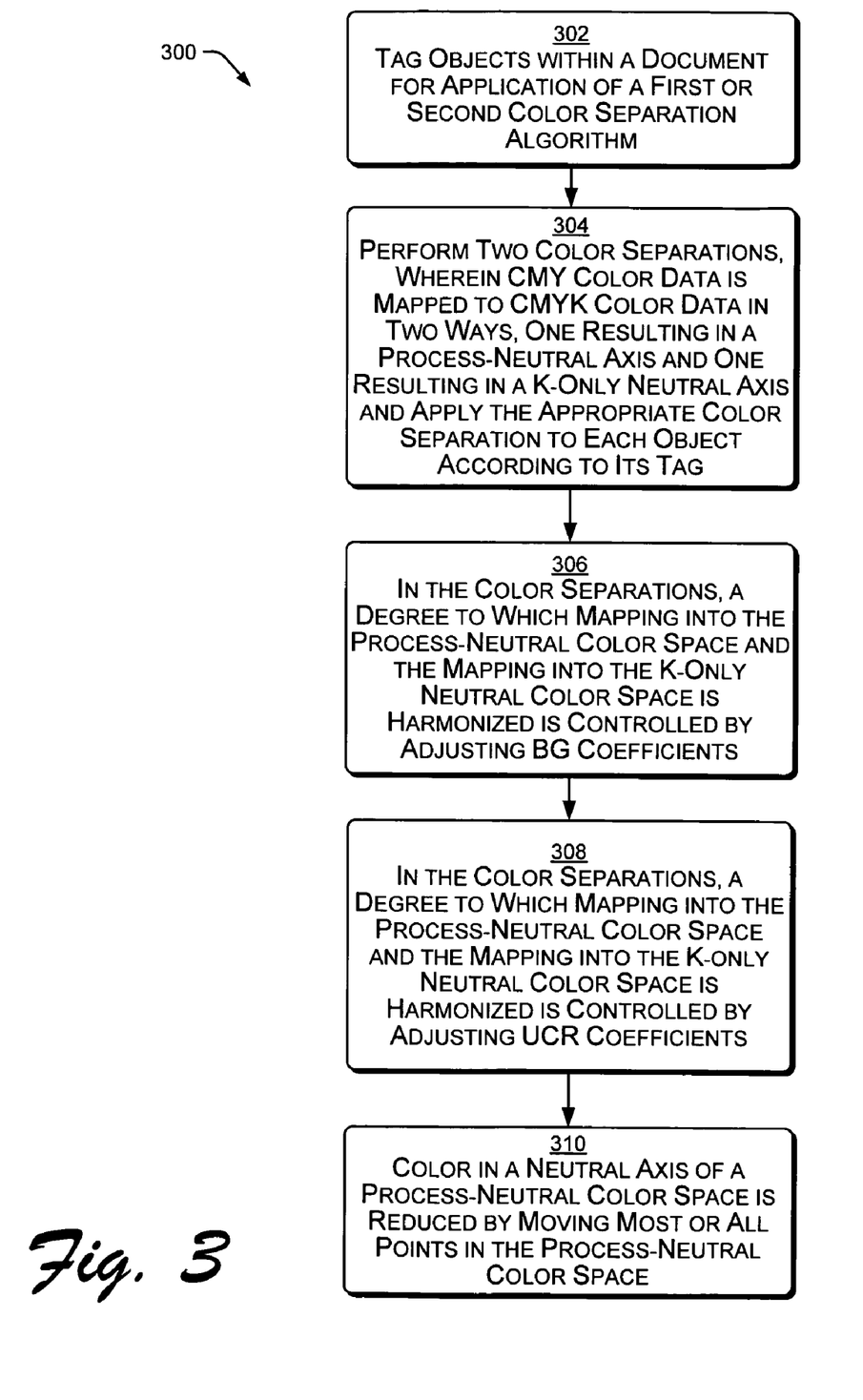
FIG. 3 is an exemplary flow diagram showing how process-neutral images and K-only neutral images may be harmonized by adjustment of black generation (BG) coefficients within a color space associated with a process-neutral image.

FIG. 3 is a flow diagram showing an exemplary method 300 by which images derived from a color space having a process-neutral axis and images derived from a color space having a K-only neutral axis may be harmonized by adjustment of black generation (BG) coefficients, under color removal (UCR) coefficients and the location of a process-neutral axis within a color space. The extent to which the process-neutral image and the K-only neutral image are harmonized with each other—i.e. the degree to which the images' appearances are made to look as if they came from a similar color gamut—may be adjusted in a pleasing manner. Thus, by adjusting the BG coefficients, the UCR coefficients and the location of the process-neutral axis, colors within the process-neutral images and K-only images, which should appear the same, actually do appear the same. The adjustment may be made by adjusting a degree to which BG and UCR color coefficients are similar for mapping the process-neutral and K-only neutral color images. The adjustment may be viewed as a blending process. From a distance from the neutral axis to the surface of the color gamut, UCR and BG coefficients are the same for both color look-up tables (CLUTs). From that same distance to the neutral axis the UCR and BG coefficients smoothly diverge from being equal, at the distance from the neutral axis, to being radically different, at the neutral axis. For example, if the process-neutral image and the K-only image are to be located in adjacent areas where a viewer's eye may easily see both almost simultaneously, the images may be harmonized by decreasing the distance from the neutral axis at which the blending process occurs, i.e. by defining the distance from the neutral axis to be closer to the neutral axis. Such an adjustment may come at the expense of a color gradient passing through the neutral axis being less smooth. In the extreme case this gradient would have noticeable color discontinuities near the neutral axis.

At block 302, objects within a document are tagged for application of a first or second color separation. For example, an object comprising text might be tagged for color separation wherein CMY color data is mapped to CMYK color data having a K-only neutral axis. Similarly, an object comprising a photograph might be tagged for color separation wherein CMY color data is mapped to CMYK color data having a process-neutral color axis.

At block 304, the document is processed using two color separations, wherein the appropriate color separation is applied to the objects according to the manner in which they were tagged. In particular, two color separations are performed, wherein CMY color data is mapped in either of two ways: one resulting in a process-neutral axis and a second resulting in a K-only neutral axis. The appropriate color separation is performed to each object according to its tag.

At block 306, in the color separations, a degree to which mapping into the process-neutral color space and to which mapping into the K-only neutral axis color space is harmonized may be controlled by adjusting BG coefficients. In one embodiment, an area near the neutral axis—within which dissimilar or different BG coefficients are generated in the course of performing the two color separations—may be increased or decreased in size. As a result, an area more remote from the neutral axis within which similar or the same BG coefficients are generated in the course of performing the two color separations may be correspondingly decreased or increased. Thus, in such an embodiment, similar BG values are generated for points within the process-neutral and the K-only neutral color separations beyond an adjustable distance from a neutral axis, and dissimilar BG values are generated for points within process-neutral and K-only neutral color spaces within the adjustable distance from the neutral axis. Significantly, the adjustable distance may be set according to the degree to which the process-neutral image and the K-only neutral image are to be harmonized. Accordingly, the degree to which colors within the two color separations are the same can be increased to result in greater harmony, or decreased to result in a smoother transition to the K-only neutral axis in the K-only neutral axis color separation.

At block 308, in the color separations, a degree to which mapping into the process-neutral color space and the mapping into the K-only neutral axis color space is harmonized is controlled by adjusting UCR coefficients. In one embodiment, an area near the neutral axis—within which dissimilar or different UCR coefficients are generated in the course of performing the two color separations—may be increased or decreased in size. As a result, an area more remote from the neutral axis within which similar or the same UCR coefficients are generated in the course of performing the two color separations may be correspondingly decreased or increased. Thus, in such an embodiment, similar UCR values are generated for points within the process-neutral and the K-only neutral color separations beyond an adjustable distance from a neutral axis, and dissimilar UCR values are generated for points within process-neutral and K-only neutral color spaces within the adjustable distance from the neutral axis. Significantly, the adjustable distance may be adjusted according to the degree to which the process-neutral image and the K-only neutral image are to be harmonized. Accordingly, the degree to which colors within the two color separations are the same can be increased to result in greater harmony, or decreased to result in a smoother transition to the K-only neutral axis in the K-only neutral axis color separation.

At block 310, color along a neutral axis within a process-neutral color space is reduced by moving most, or in some cases all, points in the process-neutral color space. An exemplary method by which this may be done is discussed further in reference to FIGS. 9 and 10.

Figure 4:
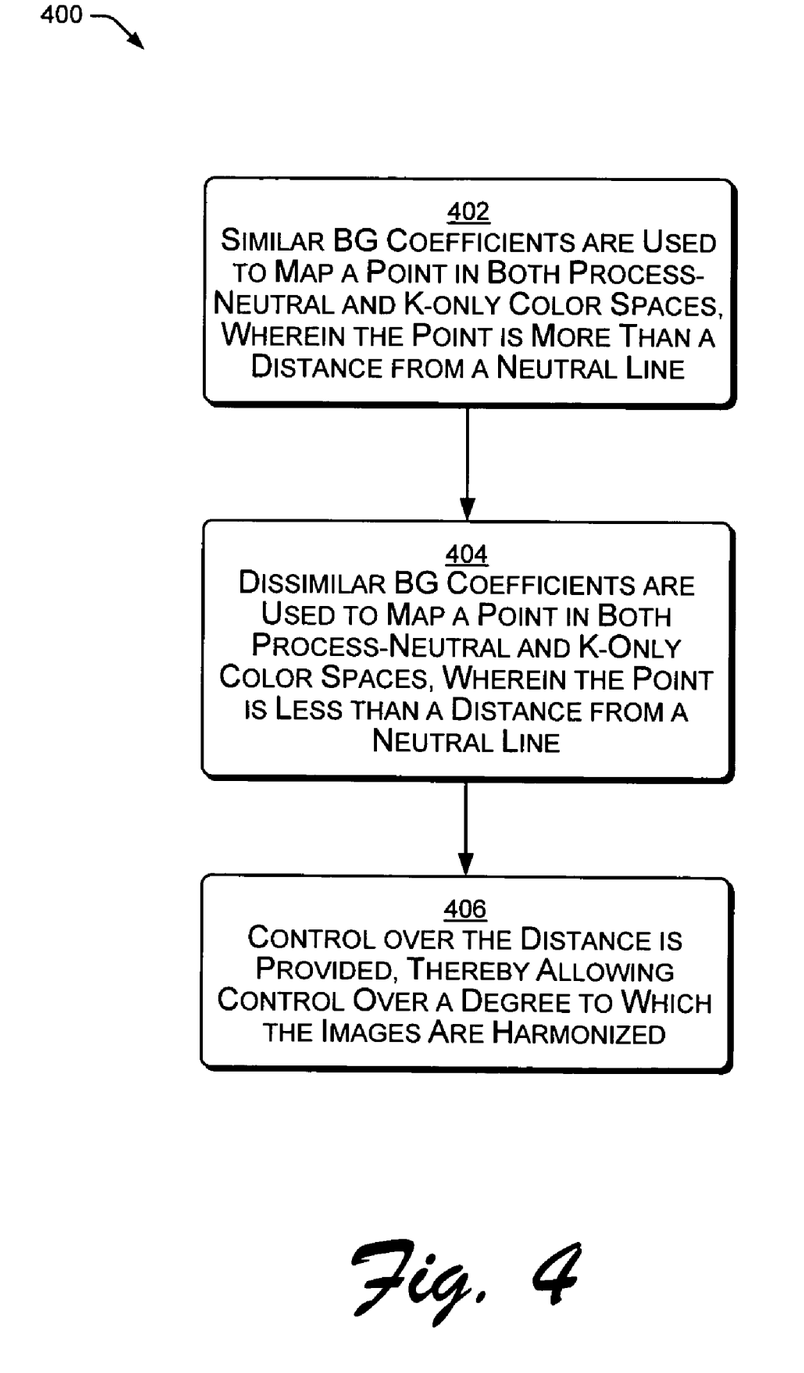
FIG. 4 is a flow diagram showing exemplary detail of the generation of BG coefficients in a manner which allows harmonization of images having a process-neutral axis with images having a K-only neutral axis.
Figure 5:
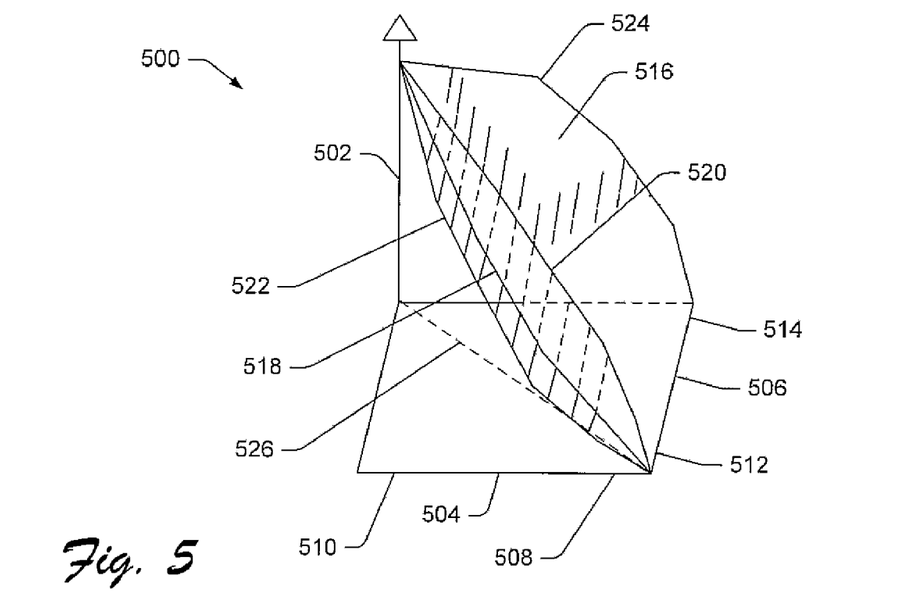
FIG. 5 shows exemplary BG coefficients, displayed for purposes of example on the vertical axis of a three-dimensional graph, as a function of minimum CMY values and maximum CMY values.

FIG. 4 is a flow diagram showing exemplary detail of a method 400 of generating BG coefficients in a manner that allows harmonization of images resulting from data associated with a color space having a process-neutral axis with images resulting from data associated with a color space having a K-only neutral axis. At block 402, the same or the similar BG values are generated for points within process-neutral and K-only neutral color spaces beyond an adjustable distance from a BG neutral axis. FIG. 5 illustrates aspects of the operation of block 402 and 404.

FIG. 5 shows exemplary graph 500 illustrating black generation (BG) coefficients. In particular, BG coefficients are values in the direction of the vertical axis 502 of a three-dimensional graph, as a function of a minimum CMY value axis 504 and a maximum CMY values axis 506. Each CMY color includes values for C, M and Y, wherein each value is typically expressed by numbers from 0.0 to 1.0. Accordingly, one of the three values will be less than or equal to the other two, and one will be greater than or equal to the other two, resulting in minimum CMY and maximum CMY values, respectively.

Continuing to refer to FIG. 5, smaller 508 and larger 510 minimum CMY numbers, as well as smaller 512 and larger 514 maximum CMY numbers may be entered on axes 504, 506, respectively. Arbitrarily set BG coefficients form a surface in 3-D space above the entered minimum and maximum CMY values, wherein a BG coefficient is associated with each pair of minimum/maximum CMY values. The selection process by which BG coefficients is obtained may be somewhat arbitrary, in that it can be based on arbitrary preferences for the appearance of certain images printed from certain BG coefficients.

A region 516 of the BG coefficient surface includes BG coefficients which are the same for both process-neutral and K-only color mapping. Accordingly, images or portions of images printed using CMY values from within this region, whether by using process-neutral and K-only processes, will have the same BG coefficients. Also, the process neutral BG module 216 and the K-only BG module 218 (each seen in FIG. 2) will return the same BG coefficient for CMY values within this region.

In contrast, CMY values in a process-neutral color space and CMY values in a K-only color space result in different BG values where the CMY values are sufficiently close to being equal (i.e. the color is sufficiently neutral or gray). Thus, while the BG values for process-neutral color and K-only color spaces were the same within region 516 up to the adjustable line 520, for values wherein C, M and Y have sufficiently similar values (i.e. they are on the side of adjustable line 520 opposite the surface 516), the process-neutral BG values are different.

Note that by moving the adjustable line to a position more nearly above line 526, the region 516 wherein BG values are the same for process-neutral and K-only neutral images is larger. Accordingly, such images, when printed next to each other will appear more harmonized, in that similar colors will be similarly printed. In contrast, by moving the adjustable line 520 to a position above points further from line 526, the region 516 wherein BG values are the same for process-neutral and K-only neutral images is smaller. As a result, images produced using a process-neutral axis (e.g. photographs) will have a smoother transition to gray, and will look better.

Note also that the line 526 represents values of C, M and Y wherein all are the same value. The BG K target axis 522 and the BG neutral axis 518 are both located directly above the line 526. While the BG neutral axis 518 is illustrated above the BG K target axis, either could have greater BG coefficient value. Thus, two surfaces which intersect the adjustable line 520 are illustrated. A first surface, representing BG coefficients used in the formation of K-only neutral axis images (e.g. business graphics, logo and charts), extends in a generally planar manner between the adjustable line 520 and the BG K target axis 522. A second surface, representing BG coefficients used in the formation of process-neutral axis images (e.g. photos), extends in a generally planar manner between the adjustable line 520 and the process-neutral axis 522.

Thus, it can be seen that both the process neutral BG module 216 (FIG. 2) and the K-only BG module 218 (FIG. 2) generate the same BG coefficients within the region of 516, wherein the variance between the values for C, M and Y are greater. However, within a region near the line 526, where the values for C, M and Y are more nearly similar, the values returned by the process neutral BG module 216 are related to the surface between the variable line 520 and the BG neutral axis 518. Similarly, the values returned by the K-Only BG module 218 are related to the surface between the variable line 520 and the BG K target axis 522.

Note that the adjustable line 520 is located above points to the right of the line 526. Adjustable line 520 can be adjusted so that it is above points that are closer or further from line 526. By moving the adjustable line 520 to a position above points closer to line 526, the region 516 is enlarged. This causes BG coefficients for a greater number of CMY values to be the same for both K-only neutral images (graphics, logos) and process-neutral images (photos). Where such images are easily seen simultaneously, their combined appearance is enhanced. By moving the adjustable line 520 to a position above points further from line 526, the region 516 is reduced. This causes BG coefficients for a smaller number of CMY values to be the same for both K-only neutral images (graphics, logos) and process-neutral images (photos). Where such images are separated, the appearance of process-neutral images (e.g. photos) is enhanced due to a more gradual transition from colors to grays. Thus, placement of adjustable line 520 balances these two desirable goals: i.e. first, greater similarity between colors produced by process-neutral and K-only neutral color spaces for a greater number of input values, and second also smoother transition to neutral. Placement of adjustable line 520 balances the two goals, respectively, by either: providing a greater number of similar BG coefficients where the line 520 is placed more nearly above line 526; or, providing a smaller number of similar BG coefficients where the line 520 is placed to reduce the size of region 516 to provide a greater number of BG coefficients for smoothly transitioning to gray in process-neutral.

A color line 524 may be defined differently for primary and secondary colors. Accordingly, BG coefficients may be specified separately for the primary and secondary hue leaves. For any given color, the percentage of secondary, or primary, is determined and the BG is then distributed pro rata between them.

Returning to FIG. 4, at block 404, dissimilar BG coefficients are used to map a point in both process-neutral and K-only color spaces when that point is less than a distance from a neutral line, i.e. less than a distance from BG K target neutral axis 522 for K-only mapping or less than the distance from BG neutral axis 518 for process-neural mapping. In particular, when mapping in a process-neutral color space, the BG coefficient is located on a surface between adjustable line 520 and the BG neutral axis 518, and when mapping in a K-only color space, the BG coefficient is located on a surface between the adjustable line 520 and the BG K target neutral axis 522.

At block 406, control over how close the adjustable line 520 is set to the BG neutral axis 518 and to the BF K target axis 522 is provided, thereby allowing control over a degree to which the images resulting from process-neutral and from K-only color space mapping are harmonized. The more distantly the adjustable line 520 is set from the BG neutral axis 518, the more gradual the transition to the BG K neutral axis 522 in an image resulting from K-only color mapping. However, the closer adjustable line 520 is set to the BG K neutral axis 522, the more colors in images formed by process-neutral and K-only neutral color spaces match. Thus, process-neutral and K-only neutral images may be harmonized by adjusting the position of adjustable line 520 to result in a degree of similarity between the images appropriate for a given application, given the circumstances. Examples of such circumstances include placement of the images, wherein the placement is (or is not) close enough on a single page to be easily compared.

Figure 6:
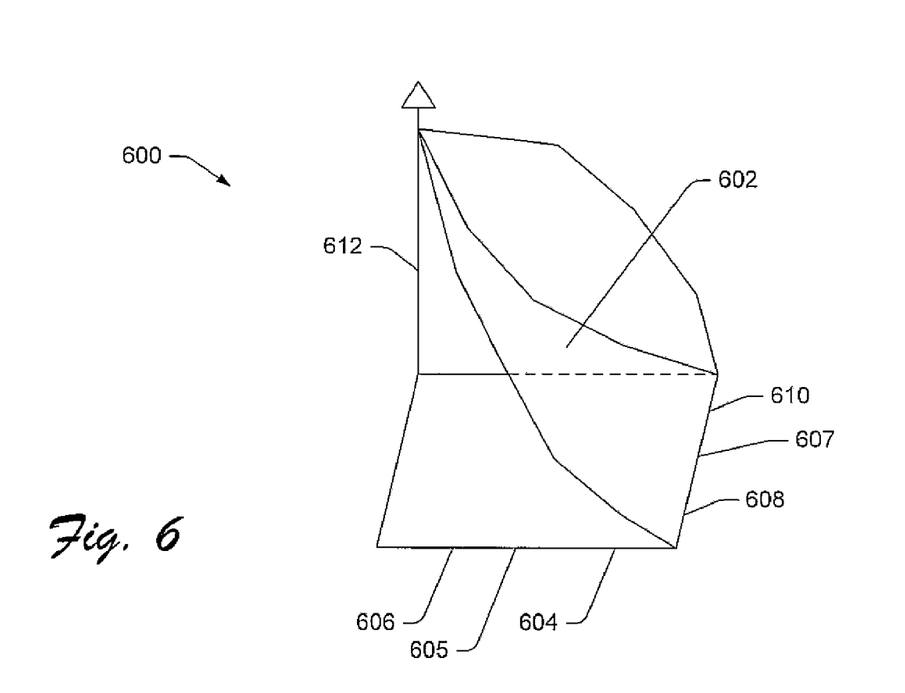
FIG. 6 shows exemplary K values, displayed for purposes of example on the vertical axis of a three-dimensional graph, as a function of minimum CMY values and maximum CMY values.

FIG. 6 depicts a graph 600 showing exemplary generation of K (black) values for use in the CMY to CMYK mapping. For purposes of example, the K values are displayed on the vertical axis 612 of a three-dimensional graph, as a function of minimum CMY values along the 605 axis and maximum CMY values along the 607 axis. Using minimum CMY and maximum CMY values in a manner similar to FIG. 5, the K values for any given value of CMY are calculated by multiplying the BG coefficient by minimum CMY to get the K value. As seen in FIG. 6, a surface 602 defines the calculated K values, wherein smaller and larger minimum CMY values 604, 606, respectively, and smaller and larger maximum CMY values 608, 610, respectively, are entered, resulting in K values having a vertical component 612.

Figure 7:
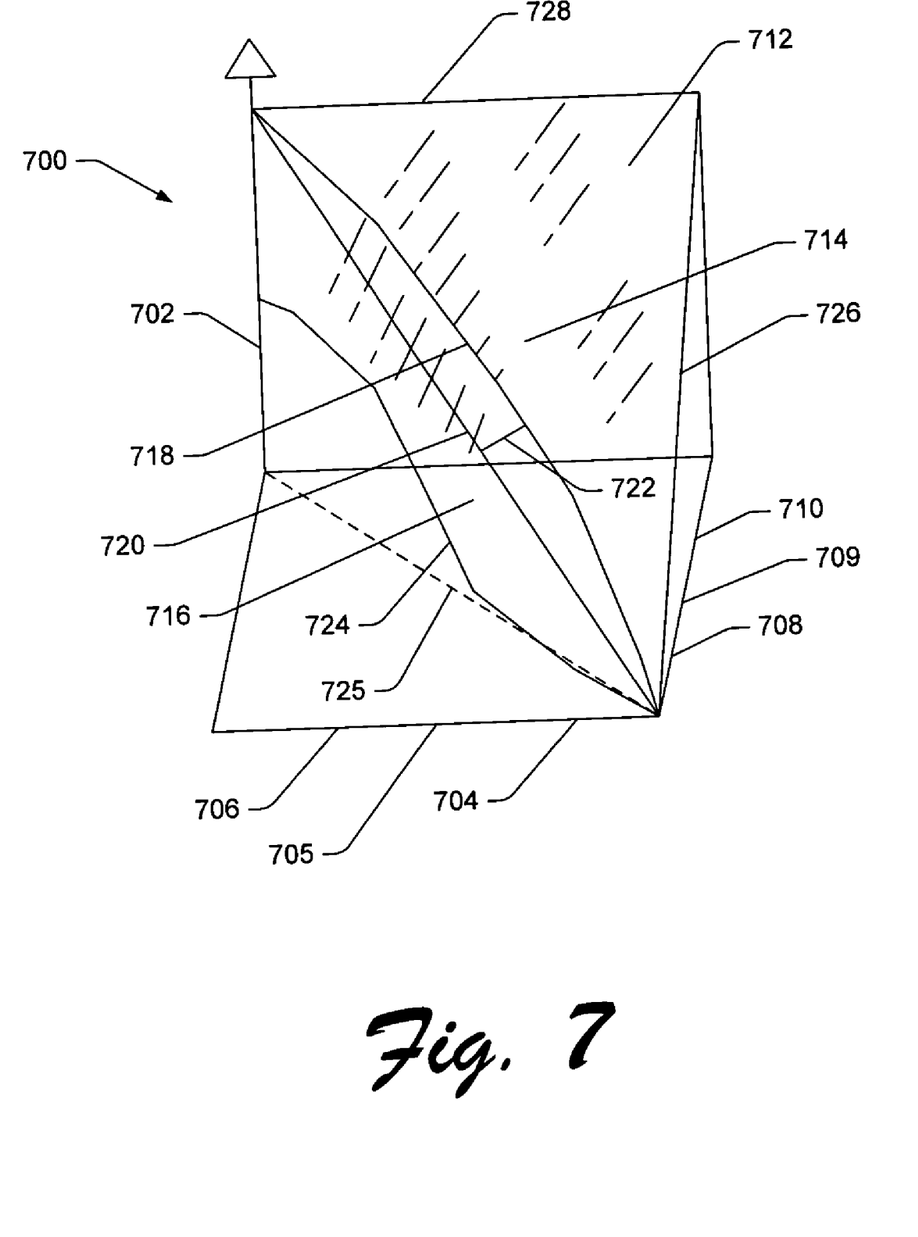
FIG. 7 shows exemplary UCR values, displayed for purposes of example on the vertical axis of a three-dimensional graph, as a function of minimum CMY and maximum CMY values.

Referring to FIG. 7, a 3-D view 700 of a diagram illustrating UCR coefficients associated with one color plane (e.g. the cyan color plane) for one image is seen. A similar diagram would illustrate other color planes—for both K-only and process-neutral axis images. Each diagram would convey UCR information for that color plane of that image. The UCR coefficients may be arbitrarily assigned values when designing the mapping process (i.e. mapping CMY to CMYK). In a typical application, the UCR coefficients are subtracted from the CMY values in the course of the CMY to CMYK mapping. While the cyan color plane is illustrated, the UCR process can be performed independently for each primary color, and optionally for each secondary color (i.e. combinations of C, M and/or Y).

The diagram 700 includes a vertical axis 702, which is typically configured to express increasing values of a UCR coefficient from 0.0 to 1.0. To determine a UCR coefficient, the minimum CMY term is entered on a minimum CMY axis 705, wherein smaller minimum CMY values 704 are entered closer to the origin, and larger minimum CMY values 706 are entered further from the origin. Additionally, the maximum CMY value is entered on a maximum CMY axis 709, wherein smaller maximum CMY values 708 are entered closer to the origin, and larger minimum CMY values 710 are entered further from the origin. As before, where three values are associated with C, M and Y, one value (minimum CMY) is less than or equal to the other two CMY values, and one value (maximum CMY) is greater than or equal to the other two CMY values.

The surface 712 representing UCR coefficients associated with minimum CMY and maximum CMY values includes an upper surface 714 and a lower surface 716 separated by an adjustable line 718 (as will be seen in greater detail below). The upper surface 714 includes UCR values wherein the underlying minimum CMY and maximum CMY terms are somewhat more different (i.e. more colorful and less gray). The lower surface 716 includes UCR values wherein the underlying minimum CMY and maximum CMY values are somewhat less different (i.e. less color, more neutral).

The upper and lower surfaces are separated by an adjustable distance line 718, which may be set at an arbitrary and adjustable distance 722 from a target neutral line 720. Notice that target neutral line 720 is not on the surface, but is above it. Thus, in the example of FIG. 7, the upper surface 714 meets the lower surface 716 at the adjustable distance line 718, which may be arbitrarily set at a desired distance from the target neutral line 720. The target neutral line 720 is located directly above a diagonal wherein the values for C, M and Y are equal.

The upper surface 714 includes UCR values that are the same (or very similar) for both process-neutral and K-only neutral color separations. Thus, process-neutral and K-only color separations have similar (or the same) UCR coefficient when the minimum CMY and maximum CMY values are sufficiently different. The lower surface 716 includes UCR values that are different for process-neutral and K-only neutral color separations. Thus, process-neutral and K-only color separations have the different UCR coefficient when the minimum CMY and maximum CMY values are sufficiently similar. The degree to which process-neutral and K-only neutral color separations have the same UCR coefficients may be controlled by moving the adjustable distance line 718 closer or further from the target neutral axis 720. This could be done, for example, by the process-neutral UCR module 224 and the K-only UCR module 226 of FIG. 2. By pulling adjustable distance line 718 close to the target neutral line 720, the UCR values for process-neutral and K-only based images would be more similar. Accordingly, such images printed near each other would look more attractive. However, by pushing the adjustable distance line 718 further from the target neutral line 720, the UCR values for process-neutral and K-only based images would be less similar. However, the appearance of process-neutral images may be enhanced by a more gradual transition from color to gray.

The upper UCR surface 714 is generally defined by three lines: adjustable distance line 718 and color space edges 726, 728. The lower UCR surface 716 is generally bounded by a lower edge 724 (directly above a diagonal 725 wherein C, M and Y values are equal) and the adjustable distance line 718. As seen above, the target neutral axis 720 is not actually on the surface.

Figure 8:
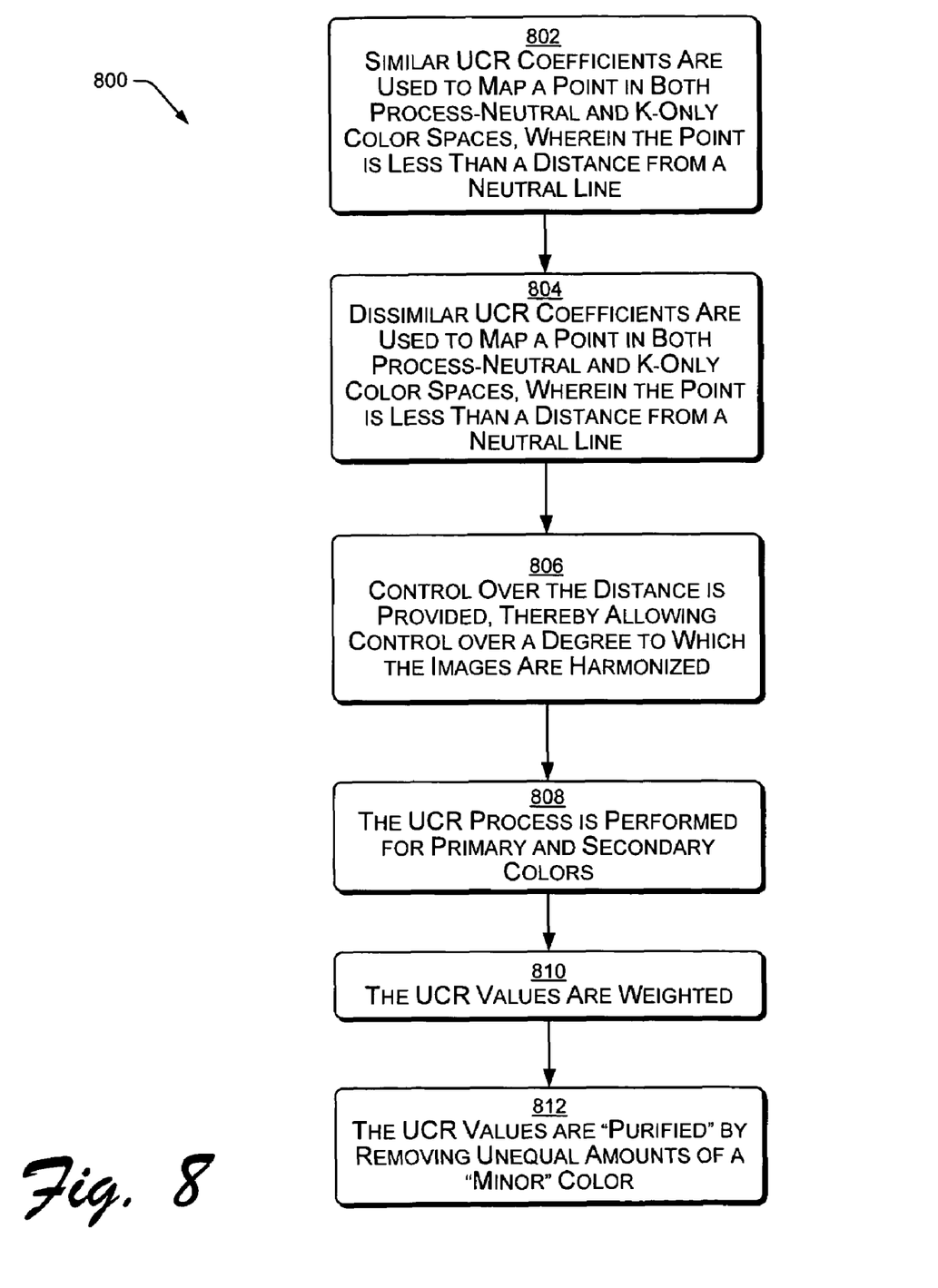
FIG. 8 is a flow diagram showing exemplary detail of the generation of UCR coefficients in a manner that allows harmonization of images having a process-neutral axis with images having a K-only neutral axis.

FIG. 8 is a flow diagram showing detail of an exemplary method 800 by which under color removal (UCR) coefficients may be generated in a manner which allows control over the degree to which images having a process-neutral axis are harmonized with images having a K-only neutral axis. At block 802, similar UCR coefficients are used to map a point in both process-neutral and K-only neutral axis color spaces, wherein the point is more than a distance from a neutral line, such as, for example, wherein the point is further from the target neutral axis 720 than the adjustable distance line 718. Referring back to FIG. 7, it can be seen that this is the case in the region 714, wherein the maximum CMY value is sufficiently different than the minimum CMY value (i.e. the CMY value is sufficiently colorful) that the resultant UCR coefficient is further from the target neutral axis 720 than the adjustable distance line 718.

At block 804, dissimilar UCR coefficients are used to map a point in both process-neutral and K-only neutral axis color spaces, wherein the point is less than a distance from the target neutral line 720 than the adjustable distance line 718. Referring again to FIG. 7, it can be seen that this is the case in the region 716, wherein the maximum CMY value is sufficiently similar to the minimum CMY value (i.e. the CMY value is sufficiently neutral) that the resultant UCR coefficient is closer to the target neutral curve 720 than the adjustably set distance line 718.

At block 806, control over the distance between the target neutral line 720 and the adjustable line 718 is provided. As a result, control over a degree to which the process-neutral and K-only neutral color separation is provided. For example, to make the output of the process-neutral and K-only neutral images more similar (i.e. to create greater harmony between the images) the distance between the target neutral line 720 and the adjustable line 718 may be reduced. Alternatively, to smooth the transition to neutral in the K-only neutral image, the adjustable line 718 should be moved further away from the target neutral line 720.

At block 808, color separation can be performed on secondary colors in the same manner as performed on primary colors in blocks 802-806, where a diagram 700 is constructed for a secondary color.

At block 810, the UCR values may be weighted as a function of distance. The value of the UCR coefficient at each minimum CMY and maximum CMY point may be defined by the surface 714, 716. The weight can be made a function of distance, which is not actually a Euclidian distance. Instead, the distance is a distance along a line perpendicular to the neutral axis intersecting both the neutral axis and the gamut boundary. This distance is normalized to be 0 on the neutral axis and 1 at the gamut boundary. Accordingly, this non-Euclidian distance may be defined to be a percentage between the zero and one, and may be used to define a line which is "parallel" to the neutral axis, in that, using the distance definition, the line is separated from the neutral axis by the distance 724. An exemplary formula embodied in source code is given below:

```
x    = max(CMY);
y    = min(CMY);
vL   = find( y <= -x + 1 );
if~isempty( vL )
    xpyd2 = ( x(vL) + y(vL) ) ./ 2;
    d1    = sqrt( ( xpyd2 - x(vL) ) .^ 2 + ( xpyd2 - y(vL) ) .^ 2 );
    dt    = sqrt( ( xpyd2 - x(vL) - y(vL) ) .^ 2 + xpyd2 .^ 2 );
    dL    = zeros(size(x(vL)));
    vNZ   = find( dt > 0 );
    if~isempty( vNZ )
        dL(vNZ) = d1(vNZ) ./ dt(vNZ);
    end
    d(vL) = dL;
end
vU   = find( y > -x + 1 );
if~isempty( vU )
    xpyd2 = ( x(vU) + y(vU) ) ./ 2;
    d1    = sqrt( ( xpyd2 - x(vU) ) .^ 2 + ( xpyd2 - y(vU) ) .^ 2 );
    dt    = sqrt( ( xpyd2 - 1 ) .^ 2 + ( xpyd2 - y(vU) + 1 - x(vU) ) .^ 2 );
    dU    = zeros(size(x(vU)));
    vNZ   = find( dt > 0 );
    if~isempty( vNZ )
        dU(vNZ) = d1(vNZ) ./ dt(vNZ);
    end
    d(vU) = dU;
end
```

In particular, those colors that are further away from the neutral axis than the intermediate lines are weighted from the intermediate lines to the color lines of both the primary colors and the secondary colors. This will result in a primary and a secondary weighted value. These values may be weighted as a function of the percentage of primary color and secondary color. The secondary percentage, and one minus the secondary percentage, may be used to weight the intermediate UCR values, which may then be summed. The UCR values for colors closer to the neutral axis than the intermediate lines are weighted in between the intermediate lines and the neutral axis. Then these colors are weighted between the primary and secondary weights as described above.

At block 812, the UCR values may be "purified" by removing greater amounts of one color than another color; i.e. for any given color, the UCR coefficient may be different for C, M and Y. For example, only the "minor" color (color having a smaller CMY value) may be removed, or a greater amount of that minor color removed than more dominate colors. In particular, where the surface 712 in FIG. 7 may be constructed differently for application to each color when it is in a "majority" situation or a "minority" situation. Thus, for example, where C=0.7, M=0.6 and Y=0.2, under color removal may operate to remove all of the yellow, but none of the cyan or magenta. This could be controlled by having a different UCR map 700 for each color (primary and secondary) for application when that color is in a minority or majority situation, wherein the map for application to a minority color could include higher UCR coefficients. Accordingly, the "purification" process is nearly identical, in result, to using 100% UCR and adding the majority color/colors back in.

Figure 9:
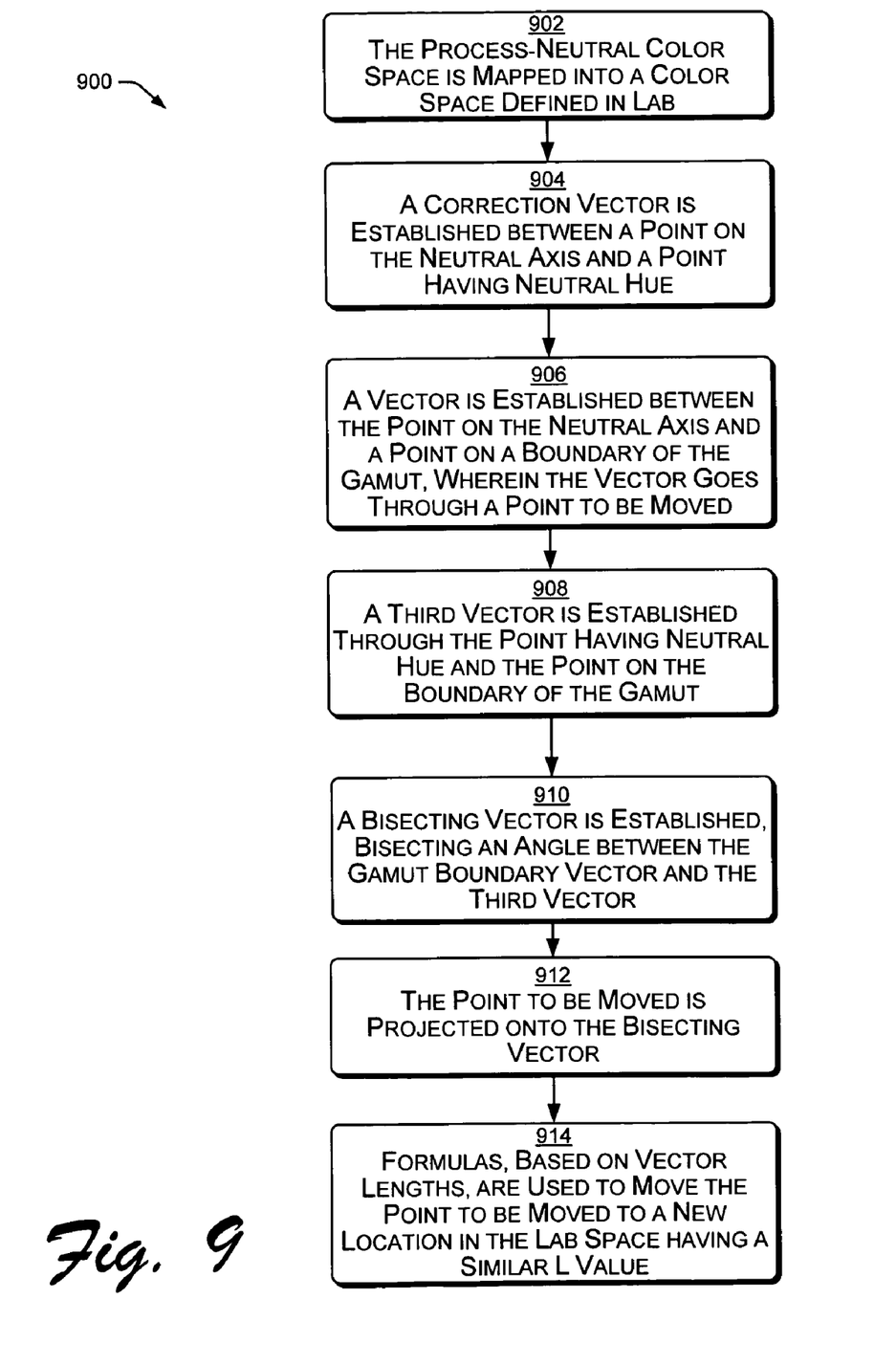
FIG. 9 is a flow diagram showing exemplary detail of a process by which the neutral axis in a color space can be moved, thereby reducing color associated with the original neutral line.
Figure 10:
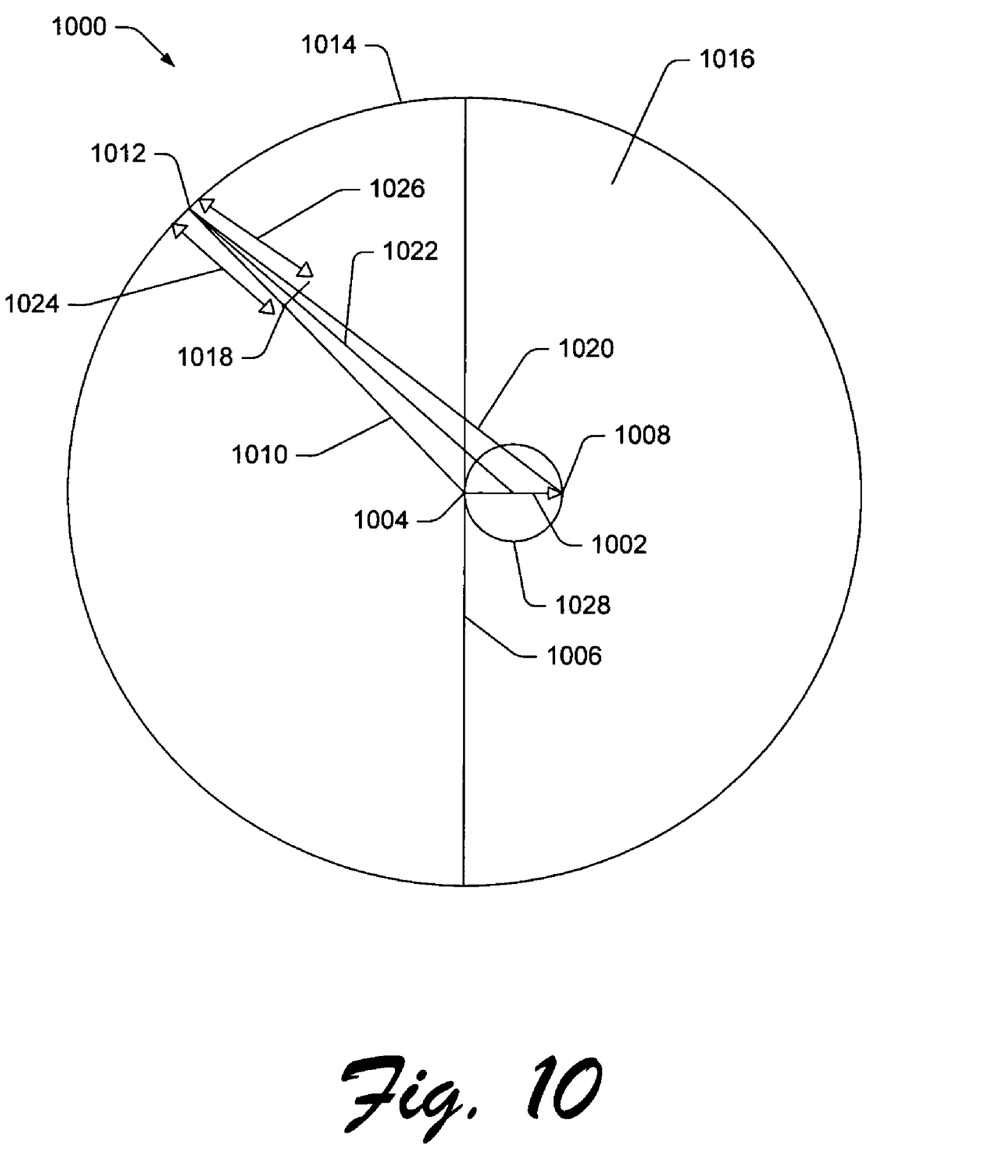
FIG. 10 shows exemplary vectors constructed within an Lab color space illustrating the exemplary method of FIG. 9.

FIG. 9 is a flow diagram showing detail of an exemplary method 900 by which the neutral line in a color space can be moved, thereby reducing color associated with the original neutral line. The method 900 may be applied to mapping CMY to CMYK color data. For example, where a process-neutral axis has unwanted color, the method 900 may be used to map the color space to result in a more neutral axis. The operation of the method 900 may be understood with occasional reference to the exemplary gamut space of FIG. 10. At block 902, the process-neutral color space is mapped into a color space 1000 defined in an Lab color space. Lab color space defines colors along two axes for color (a and b) and a third axis for lightness (L). Referring briefly to FIG. 10, a slice of Lab color space is seen, wherein the L (lightness)-axis is into and out of the paper in the center of the circle; therefore all values illustrated have the same L value. Accordingly, the illustrated two dimensional area has a similar L (lightness) value.

At block 904, a correction vector 1002 is established between a point 1004 on the neutral axis 1006 and a point 1008 having neutral hue and similar lightness value.

At block 906, a vector 1010 is established between the point 1004 on the neutral axis 1006 and a point 1012 on a boundary 1014 of the gamut 1016, wherein the vector 1010 goes through a point 1018 to be moved.

At block 908, another vector 1020 is established through the point 1008 having neutral hue and the point 1012 on the boundary 1014 of the gamut 1016.

At block 910, a bisecting vector 1022 is established, bisecting an angle between the vector 1010 and the vector 1020.

At block 912, the point 1018 to be moved is projected onto the bisecting vector 1022 by projecting point 1018 at a right angle from vector 1010 onto vector 1022. This allow measurement of two distances: first, a distance dp 1024 between the point 1012 on the boundary 1014 and the point 1018 to be moved located on vector 1010; and second, a distance dps 1026 between the point 1012 on the boundary 1014 and the projection of the point 1018 onto vector 1022.

At block 914, formulas, based on vector lengths, are used to move the point 1018 to a new location in the Lab space having a similar L value. In one implementation of the method 900, points outside circle 1028 are mapped using a different formula than points inside the circle 1028. Using exemplary formulas, points outside the circle 1028 are mapped so that L remains constant, and a becomes a+(dps/(db−0.5 vml))*vm(1) and b becomes b+(dps/(db−0.5 vml))*vm(2), where vm(1) and vm(2) are the a, b components of vector 1002 and vml is the length of the vector 1002.

Similarly, using exemplary formulas, points inside the circle 1028 are mapped so that L remains constant, and a becomes a+vm(1) and b becomes b+vm(2), wherein vm(1) and vm(2) are the a* and b* components of the vector 1002.

Although the disclosure has been described in language specific to structural features and/or methodological steps, it is to be understood that the appended claims are not limited to the specific features or steps described. Rather, the specific features and steps are exemplary forms of implementing this disclosure.

Additionally, while one or more methods have been disclosed by means of flow charts and text associated with the blocks, it is to be understood that the blocks do not necessarily have to be performed in the order in which they were presented, and that an alternative order may result in similar advantages.

The invention claimed is:

1. A processor-readable medium comprising processor-executable instructions for mapping color data, the processor-executable instructions comprising instructions for:
   adjusting a degree to which BG color coefficient generation is similar for process-neutral and K-only neutral images to produce BG coefficients;
   adjusting a degree to which UCR color coefficient generation is similar for process-neutral and K-only neutral images to produce UCR coefficients; and
   mapping CMY color data to CMYK color data using the produced BG coefficients and the produced UCR coefficients, wherein the mapping includes instructions for:

moving points in a process-neutral color space, thereby mapping the CMYK data to reduce color in neutral colors in process-neutral images, wherein moving points in a process-neutral color space includes instructions for:
  mapping the process-neutral color space into a color space defined in Lab;
  establishing a first vector between a point on a neutral axis and a point having a neutral hue;
  establishing a second vector through the point on the neutral axis and a point to be moved and a point on a boundary of the color space defined in Lab;
  establishing a third vector through the point having neutral hue and the point on the boundary of the color space defined in Lab:
  establishing a fourth vector bisecting the second and the third vectors;
  projecting the point to be moved onto the fourth vector; and
  using formulas based on lengths of the vectors to move the point to be moved to a new location in the color space defined in Lab having similar L value.

2. The processor-readable medium as recited in claim 1, wherein adjusting the degree to which BG color coefficient generation is similar includes instructions for:
  using similar BG coefficients for a color in both process-neutral and K-only images, wherein the color is greater than a distance from a neutral line;
  using dissimilar BG coefficients for a color in both process-neutral and K-only images, wherein the color is less than the distance from the neutral line; and
  controlling the distance.

3. The processor-readable medium as recited in claim 2, wherein controlling the distance includes instructions for:
  setting the distance based on whether the process-neutral and K-only neutral images will be printed side-by-side.

4. The processor-readable medium as recited in claim 1, wherein adjusting the degree to which UCR color coefficient generation is similar includes instructions for:
  using similar UCR coefficients for a color in both process-neutral and K-only images, wherein the color is greater than a distance from a neutral line; and using dissimilar UCR coefficients for a color in both process-neutral and K-only images, wherein the color is less than the distance from the neutral line.

5. The processor-readable medium as recited in claim 1, wherein adjusting the degree to which UCR color coefficient generation is similar includes instructions for:
  assigning a greater value to UCR coefficients of a minor color; and
  assigning a lesser value to UCR coefficients of more dominate colors.

6. The processor-readable medium as recited in claim 1, wherein using formulas includes instructions for:
  mapping values of a and b by adding (dps/(db−constant*vml))*vm(1) and (dps/(db−constant* vml))*vm(2) respectively; and
  mapping values of a and b by adding values a and b to the vector vm where the point to be moved is within a circle enclosing the first vector.

7. A method of controlling a degree to which a process-neutral image and a K-only neutral image are harmonized, comprising:
  generating similar BG values for colors within the process-neutral image and the K-only neutral image beyond a first distance from a first neutral axis;
  generating dissimilar BG values for colors within the process-neutral image and the K-only neutral image within the first distance from the first neutral axis;
  generating similar UCR values for colors within the process-neutral image and the K-only neutral image beyond a second distance from a second neutral axis;
  generating dissimilar UCR values for colors within the process-neutral image and the K-only neutral image within the second distance from the second neutral axis; and
  mapping CMY color data to CMYK color data using the generated BG coefficients and the generated UCR coefficients, wherein the mapping includes:
  adjusting the first and second distances to balance color similarity between the process-neutral image and the K-only neutral image against a smooth transition from colors to neutral within the K-only neutral image.

8. The method of claim 7, wherein the mapping includes:
  reducing color within a region adjacent to a neutral axis of a process-neutral color space by mapping the process-neutral color space into an Lab color space and moving a point within the Lab color space according to vectors connecting the point within the Lab color space, a point on a neutral axis in the Lab color space, a point on a boundary of the Lab color space and a point having neutral hue.

9. The method of claim 7, wherein the mapping includes:
  mapping colors into a color space defined in Lab; and
  mapping each point within the color space defined in Lab, wherein points along a process-neutral axis are mapped to more neutral colors.

10. The method of claim 9, wherein mapping each point includes:
  establishing a first vector between a point on a neutral axis and a point having neutral hue;
  establishing a second vector through the point on the neutral axis and a point to be moved and a point on a boundary of the color space;
  establishing a third vector through the point having neutral hue and the point on the boundary of the color space;
  establishing a fourth vector bisecting the second and the third vectors;
  projecting the point to be moved onto the fourth vector; and
  using formulas based on lengths of the vectors to move the point to be moved to a new location having a similar L value.

11. The method of claim 10, wherein using formulas includes:
  applying a first formula wherein a point to be moved is within a circle enclosing the first vector; and
  applying a second formula wherein the point to be moved is not within the circle enclosing the first vector.

12. A color mapping apparatus, comprising:
  a BG module to generate BG coefficients for process-neutral and K-only images, and to adjust a degree to which the generation of BG coefficients is similar for the process-neutral and the K-only images;
  a UCR module to generate UCR coefficients for process-neutral and K-only images, and to adjust a degree to which the generation of UCR coefficients is similar for the process-neutral and the K-only images;
  a mapping module to map CMK color data to CMYK color data using the generated BG coefficients and the generated UCR coefficients; and
  a neutral axis correction module to reduce color from, a neutral axis of a process-neutral color space by moving points in the process-neutral color space to make the neutral axis less colorful, wherein the neutral axis correction module comprises configurations for:
mapping the process-neutral color space into Lab color space;
establishing a first vector between a point on the neutral axis and a point having neutral hue;
establishing a second vector through the point on the neutral axis and a point to be moved and a point on a boundary of the gamut;
establishing a third vector through the point having neutral hue and the point on the boundary of the gamut;
establishing a fourth vector bisecting the second and third vectors;
projecting the point to be moved onto the fourth: and
using formulas based on the vectors to move the point to be moved to a new location having similar L value with less color.

13. The color mapping apparatus of claim 12, where in the BG module comprises configurations for:
using similar BG coefficients to map a color in both process-neutral and K-only mapping, wherein the color is greater than a distance from a neutral line;
using dissimilar BG coefficients to map a color in both process-neutral and K-only mapping, wherein the color is less than the distance from the neutral line; and
controlling the distance to achieve a desired degree of harmony between the process-neutral and K-only images.

14. The color mapping apparatus of claim 12, where in the UCR module comprises configurations for:
using similar UCR coefficients to map a color in both process-neutral and K-only mapping, wherein the color is greater than a distance from a neutral line;
using dissimilar UCR coefficients to map a color in both process-neutral and K-only mapping, wherein the color is less than the distance from the neutral line; and
controlling the distance to achieve a desired degree of harmony between the process-neutral and K-only images.

15. The color mapping apparatus of claim 12, wherein the neutral axis correction module additionally comprises configurations for:
mapping values of a and b by adding (dps/(db−constant*vml))*vm(1) and (dps/(db−constant*vml))*vm(2) respectively; and
mapping values of a and b by adding them to the vector vm where the point to be moved is within a circle enclosing the correction vector.

16. A processor-readable medium comprising processor-executable instructions for controlling a degree to which a process-neutral image and a K-only neutral image are harmonized, the processor-executable instructions comprising instructions for:
generating similar BG values for colors within the process-neutral image and the K-only neutral image beyond a distance from a neutral axis
generating dissimilar BG values for colors within the process-neutral image and the K-only neutral image within the distance from the neutral axis;
mapping CMY color data to CMYK color data using the generated BG coefficients: and
adjusting the distance to balance color similarity between the process-neutral image and the K-only neutral image against a smooth transition to the neutral axis in colors within the K-only neutral image.

17. The processor-readable medium as recited in claim 16, wherein the mapping includes instructions for:
reducing color within a region adjacent to the neutral axis by moving most or all points in a process-neutral color space within which the process-neutral axis is defined.

18. The processor-readable medium as recited in claim 16, wherein the mapping includes instructions for:
reducing color within a region adjacent to the neutral axis within a process-neutral color space by mapping process-neutral colors into an Lab color space and moving a point within the Lab color space according to vectors connecting the point within the Lab color space, a point on the neutral axis, a point on a gamut boundary and a point having neutral hue.

19. A method of controlling a degree to which a process-neutral image and a K-only neutral image are harmonized, comprising:
generating similar BG values for colors within the process-neutral image and the K-only neutral image beyond a first distance from a first neutral axis
generating dissimilar BG values for colors within the process-neutral image and the K-only neutral image within the first distance from the first neutral axis;
generating similar UCR values for colors within the process-neutral image and the K-only neutral image beyond a second distance from a second neutral axis
generating dissimilar UCR values for colors within the process-neutral image and the K-only neutral image within the second distance from the second neutral axis; and
mapping CMY color data to CMYK color data using the generated BG coefficients and the generated UCR coefficients, wherein the mapping includes reducing color within a region adjacent to a neutral axis of a process-neutral color space by mapping the process-neutral color space into an Lab color space and moving a point within the Lab color space according to vectors connecting the point within the Lab color space, a point on a neutral axis in the Lab color space, a point on a boundary of the Lab color space and a point having neutral hue.

20. A processor-readable medium comprising processor-executable instructions for controlling a degree to which a process-neutral image and a K-only neutral image are harmonized, the processor-executable instructions comprising instructions for:
generating similar BG values for colors within the process-neutral image and the K-only neutral image beyond a distance firm a neutral axis;
generating dissimilar BG values for colors within the process-neutral image and the K-only neutral image within the distance from the neutral axis; and
mapping CMY color data to CMYK color data using the generated BG coefficients, wherein the mapping includes instructions for:
reducing color within a region adjacent to the neutral axis within a process-neutral color space by mapping process-neutral colors into an Lab color space and moving a point within the Lab color space according to vectors connecting the point within the Lab color space, a point on the neutral axis, a point on a gamut boundary and a point having neutral hue.

21. A method of controlling a degree to which a process-neutral image and a K-only neutral image are harmonized, comprising:
generating similar BG values for colors within the process-neutral image and the K-only neutral image beyond a first distance from a first neutral axis;

generating dissimilar BG values for colors within the process-neutral image and the K-only neutral image within the first distance from the first neutral axis;

generating similar UCR values for colors within the process-neutral image and the K-only neutral image beyond a second distance from a second neutral axis;

generating dissimilar UCR values for colors within the process-neutral image and the K-only neutral image within the second distance from the second neutral axis; and mapping CMY color data to CMYK color data using the generated BG coefficients and the generated UCR coefficients, wherein the mapping includes:
 mapping colors into a color space defined in Lab; and
 mapping each point within the color space defined in Lab, wherein points along a process-neutral axis are mapped to more neutral colors, wherein mapping each point includes:
  establishing a first vector between a point on a neutral axis and a point having neutral hue;
  establishing a second vector though the point on the neutral axis and a point to be moved and a point on a boundary of the color space;
  establishing a third vector through the point having neutral hue and die point on the boundary of the color space;
  establishing a fourth vector bisecting the second and the third vectors;
  projecting the point to be moved onto the fourth vector; and
  using formulas based on lengths of the vectors to move the point to be moved to a new location having a similar L value.

\* \* \* \* \*

UNITED STATES PATENT AND TRADEMARK OFFICE
CERTIFICATE OF CORRECTION

PATENT NO. : 7,433,511 B2
APPLICATION NO. : 10/688601
DATED : October 7, 2008
INVENTOR(S) : Steve A. Jacob It is certified that error appears in the above-identified patent and that said Letters Patent is hereby corrected as shown below:

In column 13, line 15, in Claim 1, after "Lab" delete ":" and insert -- ; --, therefor.

In column 13, line 37, in Claim 3, delete "w ill" and insert -- will --, therefor.

In column 14, line 65, in Claim 12, delete "from," and insert -- from --, therefor.

In column 15, line 11, in Claim 12, after "gamut" delete ":" and insert -- ; --, therefor.

In column 15, line 44, in Claim 15, delete "(dps/(db-constant*vml)" and insert -- (dps/(db-constant*vml)) --, therefor.

In column 15, line 56, in Claim 16, after "axis" insert -- ; --.

In column 15, line 61, in Claim 16, after "coefficients" delete ":" and insert -- ; --, therefor.

In column 16, line 19, in Claim 19, after "axis" insert -- ; --.

In column 16, line 25, in Claim 19, after "axis" insert -- ; --.

In column 16, line 47, in Claim 20, delete "firm" and insert -- from --, therefor.

In column 18, line 3, in Claim 21, delete "though" and insert -- through --, therefor.

In column 18, line 7, in Claim 21, delete "die" and insert -- the --, therefor.

Signed and Sealed this

Tenth Day of March, 2009

JOHN DOLL
*Acting Director of the United States Patent and Trademark Office*